United States Patent
Butler et al.

(10) Patent No.: US 9,286,418 B1
(45) Date of Patent: Mar. 15, 2016

(54) METHOD FOR DESIGNING AN ACOUSTIC ARRAY

(71) Applicants: Stephen C Butler, Portsmouth, RI (US);
Thomas A Frank, Middletown, RI (US);
Jackeline D Diapis, Newport, RI (US)

(72) Inventors: Stephen C Butler, Portsmouth, RI (US);
Thomas A Frank, Middletown, RI (US);
Jackeline D Diapis, Newport, RI (US)

(73) Assignee: The United States of America as represented by the Secretary of the Navy

( * ) Notice: Subject to any disclaimer, the term of this patent is extended or adjusted under 35 U.S.C. 154(b) by 198 days.

(21) Appl. No.: 14/267,150

(22) Filed: May 1, 2014

(51) Int. Cl.
*G10K 11/32* (2006.01)
*G06F 17/50* (2006.01)
*G10K 11/34* (2006.01)

(52) U.S. Cl.
CPC ............... *G06F 17/50* (2013.01); *G10K 11/32* (2013.01); *G10K 11/34* (2013.01)

(58) Field of Classification Search
CPC ....... G10K 11/32; G10K 11/26; G10K 11/34; G06F 17/50
See application file for complete search history.

(56) References Cited

U.S. PATENT DOCUMENTS

| | | | | |
|---|---|---|---|---|
| 3,881,164 A * | 4/1975 | Kossoff | ................. | A61B 8/145 367/103 |
| 7,406,001 B1 * | 7/2008 | Dzikowicz | ................. | G01S 1/82 367/138 |
| 8,331,197 B2 * | 12/2012 | Stytsenko | ............. | G01S 7/2813 367/138 |
| 8,345,511 B1 * | 1/2013 | Rikoski | ................. | B06B 1/0622 342/157 |
| 2015/0085617 A1 * | 3/2015 | Savord | ................ | G01S 7/52095 367/138 |

* cited by examiner

*Primary Examiner* — Daniel Pihulic
(74) *Attorney, Agent, or Firm* — James M. Kasischke; Michael P. Stanley

(57) ABSTRACT

A method for designing an acoustic array includes establishing a desired beam pattern, acoustic wavelength and beamwidth for the array. Geometric parameters are calculated from these constraints. The array is modeled as a plurality of elements positioned in accordance with the geometric parameters. An amplitude shading function is calculated. An array of acoustic elements is constructed having an area calculated from the calculated amplitude shading function. An acoustic array designed by this process is further provided.

16 Claims, 6 Drawing Sheets

METHOD FOR DESIGNING AN ACOUSTIC ARRAY

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION (1) Field of the Invention

The present invention is directed to a method for designing an acoustic array and more particularly to a method for designing an acoustic array with simplified wiring and processing.

(2) Description of the Prior Art

Beamforming is used in active and passive sonar to increase the efficiency or gain from an array of transducers. In such an array, each transducer is separately wired to acoustic processing equipment. The acoustic processing equipment adjusts the power and time delay associated with the joined transducer. This requires separately controlling the signal associated with each array element.

Conventional arrays modify beam patterns to lower sidelobes by electrically shading the outputs of a number of elements, or less effectively, by using multiple elements in a series parallel connection. It is known that types of hydrophones, such as PVDF hydrophones, can be shaped so as to achieve the same, reduced sidelobe levels as a number of electrically shaded elements thereby eliminating the electronics and saving space. It has been shown that a single element can be shaped as a linear tapered element or an element shaped to an approximation of a −40 dB Chebyshev shading function can be used to reduce the sidelobes from that which would be expected with a rectangular element. These single elements are mounted to a cylindrical surface before use. These methods teach suppression of sidelobes by area shading, but they don't teach a method for designing an acoustic transducer or sensor to a preferred beam pattern.

Curved and doubly curved geometries are known for active and passive sonar arrays; however, in the prior art, the array shape is dictated by the underlying object, not the beam pattern. Electronic shading is typically used for giving a preferred beam pattern. One such array is given by U.S. Pat. No. 6,711,096 to Kim C. Benjamin. Also known are methods for making arrays having conforming shapes such as that given in U.S. Pat. No. 6,255,761 to Benjamin.

SUMMARY OF THE INVENTION

It is a first object of the present invention to provide a method for designing acoustic arrays in accordance with a preferred beam pattern;

Another object is to design acoustic arrays that minimize the use of processing and electronics to achieve the desired beam pattern; and Yet another object is to provide an acoustic array having a beam pattern that conserves power by avoiding projection of acoustic energy in undesired directions.

Accordingly, there is provided a method for designing an acoustic array that includes establishing a desired beam pattern, acoustic wavelength and beamwidth for the array. Geometric parameters are calculated from these constraints. The array is modeled as a plurality of elements positioned in accordance with the geometric parameters. An amplitude shading function is calculated. An array of acoustic elements is constructed having an area calculated from the calculated amplitude shading function. An acoustic array designed by this process is further provided.

BRIEF DESCRIPTION OF THE DRAWINGS

Reference is made to the accompanying drawings in which are shown an illustrative embodiment of the invention, wherein corresponding reference characters indicate corresponding parts, and wherein.

DETAILED DESCRIPTION OF THE INVENTION

Figure 1:
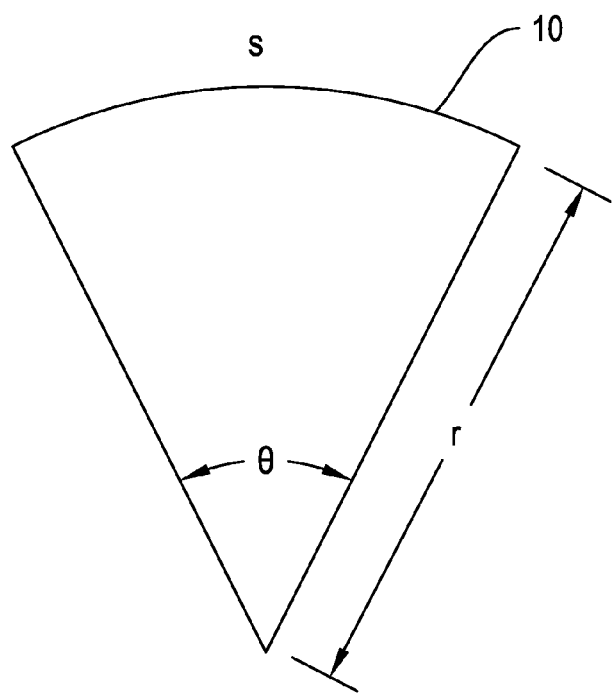
FIG. 1 is a diagrammatic view of a curved line array.

FIG. 1 shows a line source 10 curved circularly. This type of source produces a constant wide beam pattern over a broad frequency band. The beamwidth (BW) of the pattern is controlled by the active area arc length s and angle ($\theta$) coverage when the aperture radius r is much greater than the acoustic wavelength $\lambda$. The −6 dB beamwidth (BW −6 dB) is approximately equal to the total angle ($\theta$) in degrees when r>8$\lambda$. The beamwidth in degrees of a lobe is ordinarily measured from where the signal falls off by 6 dB on either side of the main lobe. As known in the art, this is the −6 dB beamwidth. In source 10, the −6 dB beamwidth (BW −6 dB) is approximately equal to the angle ($\theta$) of the source 10 in degrees when r>8$\lambda$.

Figure 2:
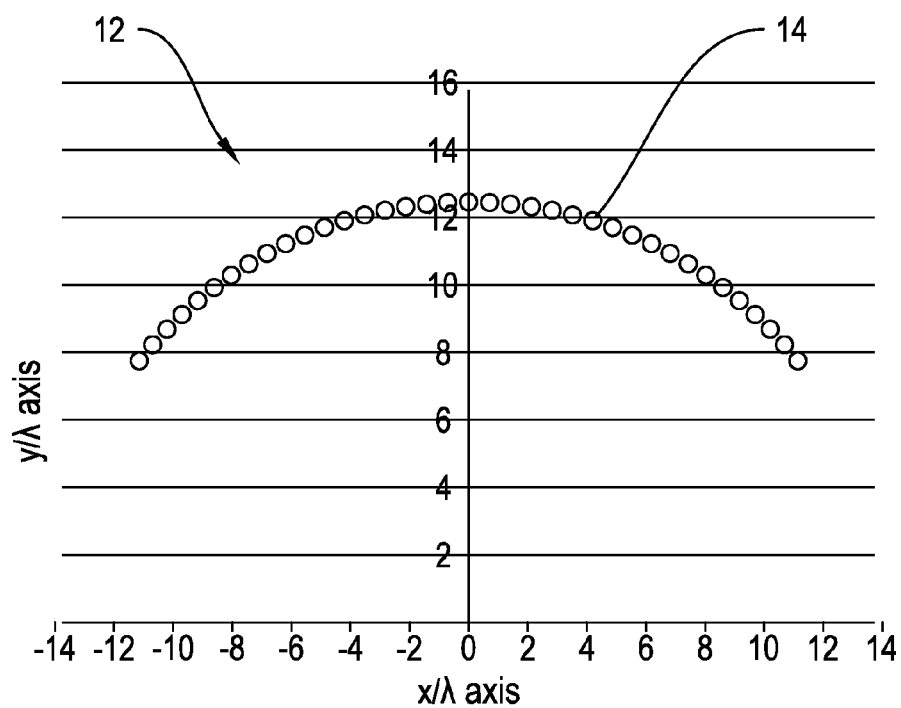
FIG. 2 is a model of the curved line array of FIG. 1 using discrete points.
Figure 3:
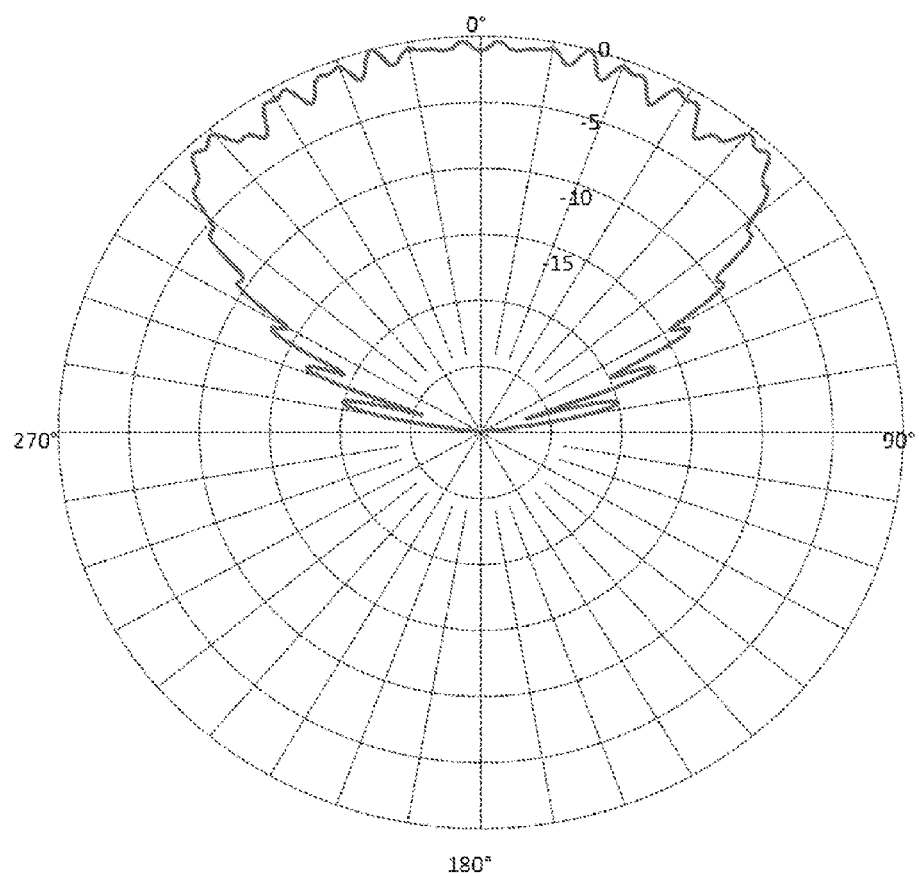
FIG. 3 is a beam pattern generated by an array such as that given in FIG. 2.

FIG. 2 shows this line source modeled as an array 12 of discrete point sources 14 along an arc. This array 12 has one point source 14 at every degree from +55° to −55° (110° total and 111 point sources) and a radius of 13.75 wavelengths (r=13.75$\lambda$). In FIG. 2, the x-y axes are normalized by the acoustic wavelength. This will generate a fan-shaped beam pattern 16 that is approximately equal to 110° wide at 6-dB down points 18 as shown in FIG. 3. The beam pattern frequency is at $f_o=c/\lambda$, where c is 1,500 m/s, the sound speed in water. The point sources 14 in the model all have the same uniform amplitude weighting coefficients of 1. The beam pattern has an oscillatory behavior known as ripple or scalloping (resembling a scallop clam shell shape) which is described mathematically as the Gibbs Phenomenon. The beam pattern 16 shown here has constructive and destructive interference caused by the path lengths of the point sources 14. A continuous line source would smooth, or average, these far-field pressures and have an ideal oscillatory pattern.

In order to form a beam pattern of a desired shape, amplitude shading is applied to the point source model given in FIG. 2. As an example, one desired beam pattern 20 is provided in FIG. 4. Beam pattern 20 is obtained by applying logarithmic shading to each point source element 14. Utilizing this shading, the amplitude level provided to the element 14 drops 1 dB for each degree from 40° to 0° as shown in FIG. 5. In the range of 55° to 40°, the amplitude is 0 dB or value of unity in order to maintain the 45° beam in FIG. 4 without any attenuation. This results in the beam pattern shown in FIG. 6.

In the prior art, element amplitude shading was used to obtain the desired beam pattern. Typically, an uncurved linear array of transmitters is used. Beamforming is performed by providing amplitude weighted and timed signals to each element of the array. This results in complex wiring and electronics because it requires that each element be separately addressable.

The current method utilizes active area shading instead of amplitude shading. In this method the active radiating surface area of the array element is designed to have an area in accordance with that of the amplitude coefficients chosen to generate a particular beam pattern shape. Signal delays are given by the element's relative positioning along the curved array. This positioning gives constructive or destructive interference among the elements of the array.

Figure 4:
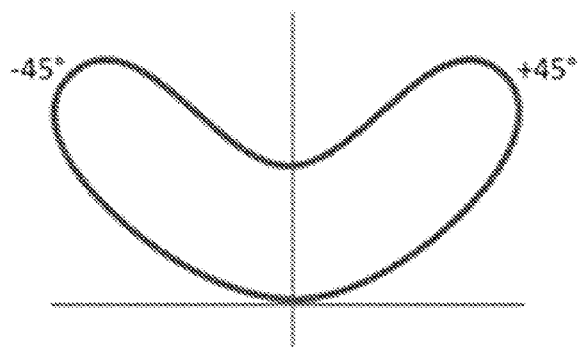
FIG. 4 is a desired beam pattern for designing an array according to the current invention.
Figure 5:
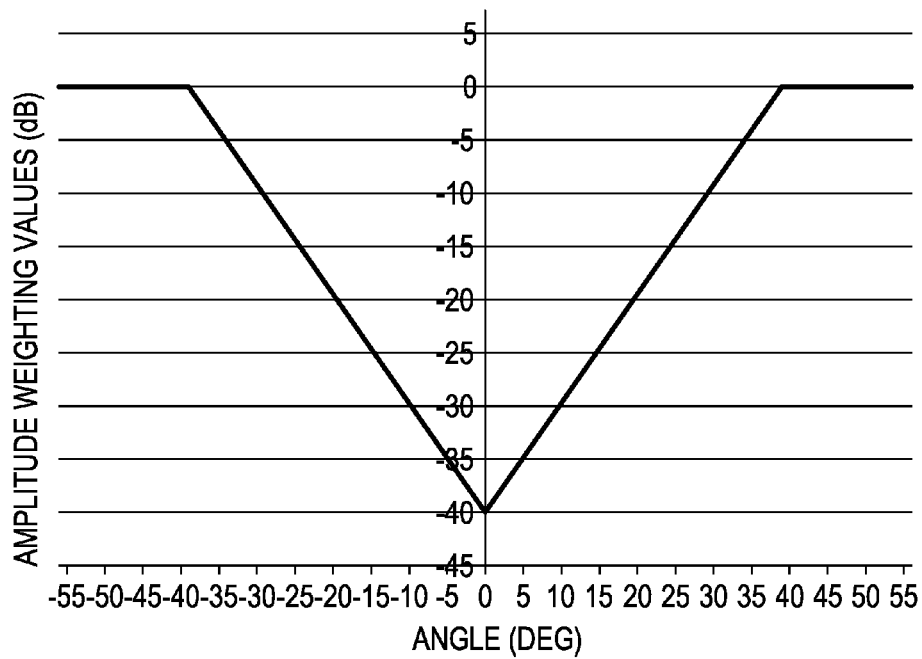
FIG. 5 is a graph of desired weightings versus angles for designing an array according to FIG. 4.
Figure 6:
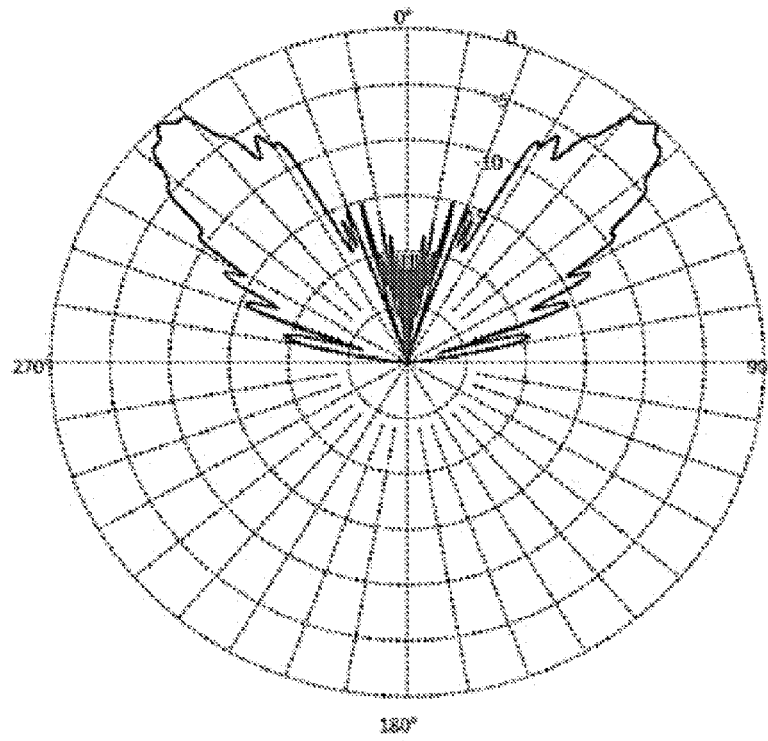
FIG. 6 is a graph of the resulting beam pattern from the weightings given in FIG. 5.
Figure 7:
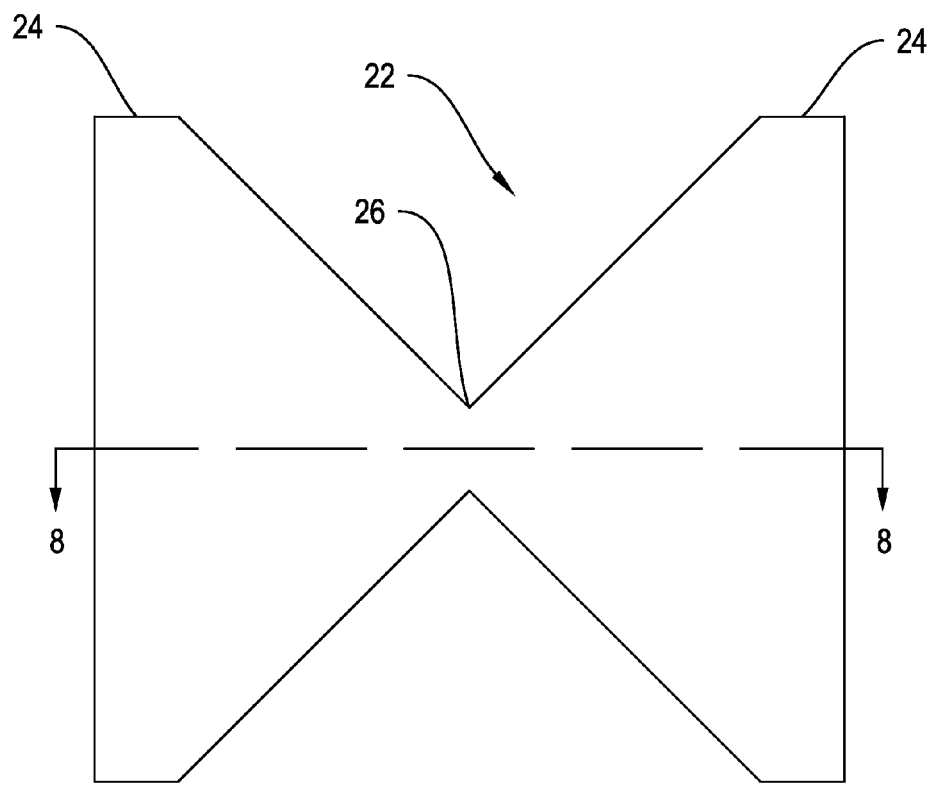
FIG. 7 is a top view of a first embodiment of a continuous array in accordance with the weightings given in FIG. 5.
Figure 8:
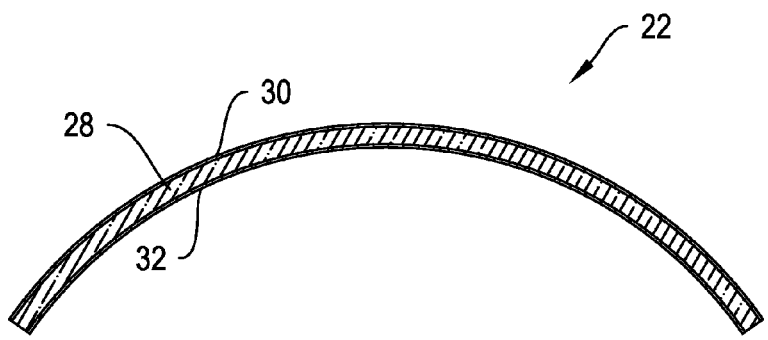
FIG. 8 is a cross-sectional view of the continuous array given in FIG. 7.

Utilizing the beam pattern of FIG. 4, the case of the logarithmic amplitude shading values in FIG. 5 gives an array 22 as shown in FIG. 7. This array has the appearance of a curved bowtie or an hourglass. End portions 24 of array 22 have a larger area as required by the beam shading function given in FIG. 5. Center portion 26 of array 22 has a much smaller area to give the attenuation desired at the center of the array. A sectional view along line 8-8 is given in FIG. 8. Array 22 includes transduction material 28 sandwiched between electrodes 30 and 32. Transduction material can be a continuous type of transducer material such as piezoelectric polymers. These include PVDF, 0-3 piezo-rubber, and 1-3 piezo-composites, which are semi-flexible continuous sheets. As can be seen in the sectional view, foil electrodes 30 and 32 are deposited, or etched, right on the surface of the transducer material. (FIG. 8 is not to scale, and electrodes 30 and 32 are much thinner than shown.) The use of area shading allows the same electrical drive voltage to be applied to all of the elements in this array, eliminating complex wiring and sonar beamformer electronics.

Figure 9:
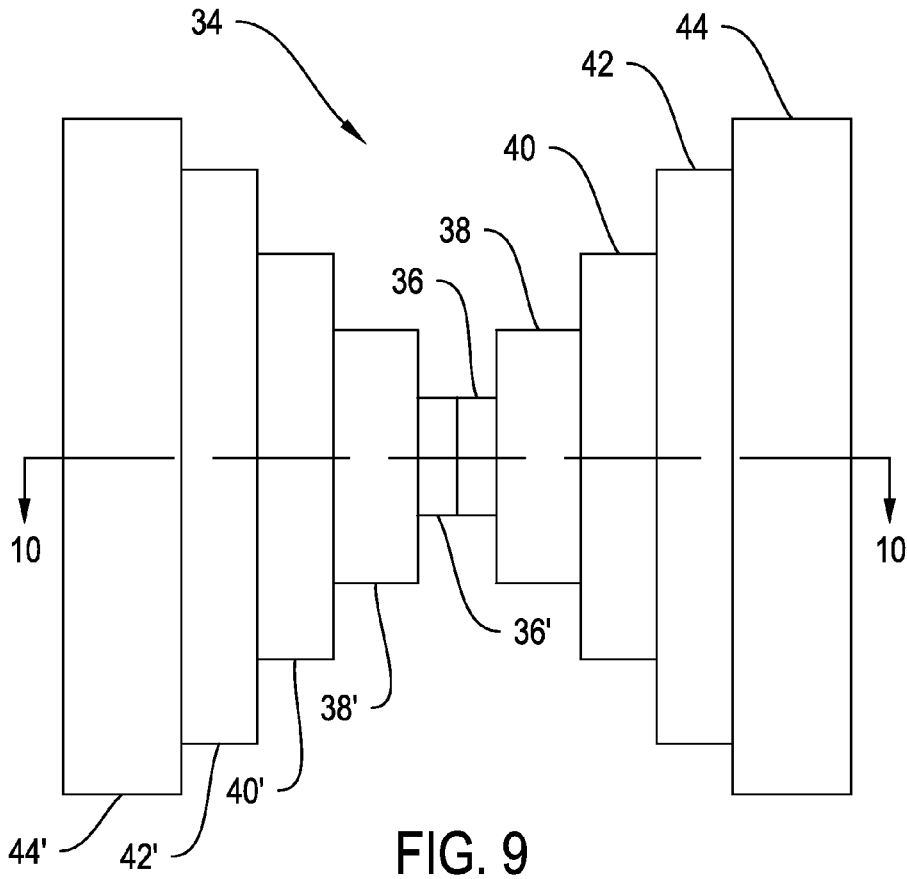
FIG. 9 is a top view of a second embodiment of a discrete array in accordance with the weightings given in FIG. 5.

For modeling and fabrication, this array could be made more practical by discretizing the continuous array 22 of FIGS. 7 and 8 into a more practical array 34 having discrete sub-arrays 36, 38, 40, 42 and 44 of transducer elements as shown in FIG. 9. The areas of the sub-arrays determine the sound pressure level (SPL) that is produced within the coverage angle of the sub-array. Array 34 in FIG. 9 includes nine sub-arrays that are positioned to direct the energy into a fixed coverage angle. As an example, in FIG. 9, sub-array 44 with area $A_1$ will radiate full sound pressure level $P_1$ in the 55° to 36° angle coverage in order to maintain the 45° beam without attenuation. Sub-array 42 with area $A_2$ will radiate a 10-dB reduction in sound pressure level $P_2$ for the 35° to 26° angle coverage, thus $A_2=0.316*(A_1)$. Sub-array 40 area $A_3$ will radiate a reduced 20 dB in SPL in 25° to 16° angle coverage by area $A_3=0.1*(A_1)$. Sub-array 38 area $A_4$ will radiate a reduced 30 dB in SPL in 15° to 6° angle coverage by area $A_4=0.0316*(A_1)$. Sub-array 36 area $A_5$ will radiate a reduced 40 dB in SPL in 5° to 0° angle coverage by area $A_5=0.01*(A_1)$, which is repeated as subarray 36' having angular coverage of 0° to −5° on the right side of the array 34.

Figure 10:
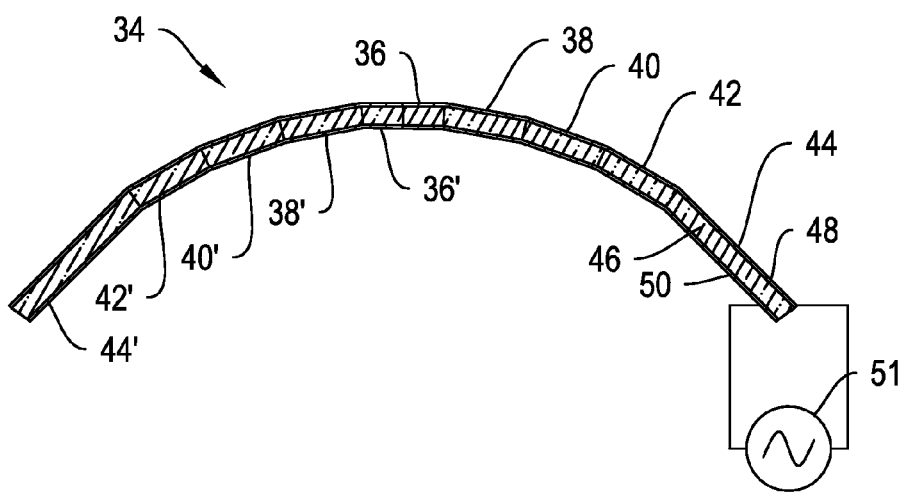
FIG. 10 is a cross-sectional view of the dicrete array given in FIG. 9.

FIG. 10 is a cross-sectional view of array 34 taken along line 10-10 of FIG. 9. Sub-arrays 36, 36', 38, 38', 40, 40', 42, 42', 44, and 44' are shown in cross-section. Each sub-array comprises transducer material 46 in electrical contact between a first electrode 48 and a second electrode 50. Transducer material 46 can be any piezoelectric or ferroelectric transducer material known in the art. A function generator 51 or other electronics is joined to all of the elements of the array. This embodiment allows for transducer materials that are available in flat geometries and/or those that are limited to certain sizes by costs or physics.

The acoustic output power for an electro-acoustic transducer is the acoustic intensity multiplied by its radiating surface area ($W_o=I_o\times A$). Its electrical input power, $W_{in}$, and acoustic output power, $W_o$, are related by the electro-acoustic efficiency of the transducer by $\eta_{eff}=W_o/W_{in}$. For a transducer that is 50% efficient, its acoustic output power is one-half of the electrical input power. For a 100% efficient transducer, input and output power are equal. Sonar transducer efficiencies typically range between 50% and 90% depending on the design type. Array 34 shown in FIG. 9 has nine sub-arrays, each with its own surface area. Total area is $A_T=2*(A_1)+2*(A_2)+2*(A_3)+2*(A_4)+A_5$. If all of the sub-arrays were of the same length and width as $A_1$, the array would produce a fan-shaped beam pattern similar to that of FIG. 3. The total surface area would be $A_T=9*(A_1)$, with the acoustic output power being nine times that of $A_1$. The total electrical input power would also be nine times greater than $A_1$ because $W_o=\eta_{eff}W_{in}$. Comparing this with the area shaded design in FIG. 9, where $A_1=1$, $A_2/A_1=0.316$, $A_3/A_1=0.1$, $A_4/A_1=0.0316$, and $A_5/A_1=0.01$; the total area for the shaded design is $2.9*(A_1)$. The area of the shaded design is approximately one-third less than the area of the equal area sub-arrays array and will require approximately one-third less electrical input power.

Figure 11:
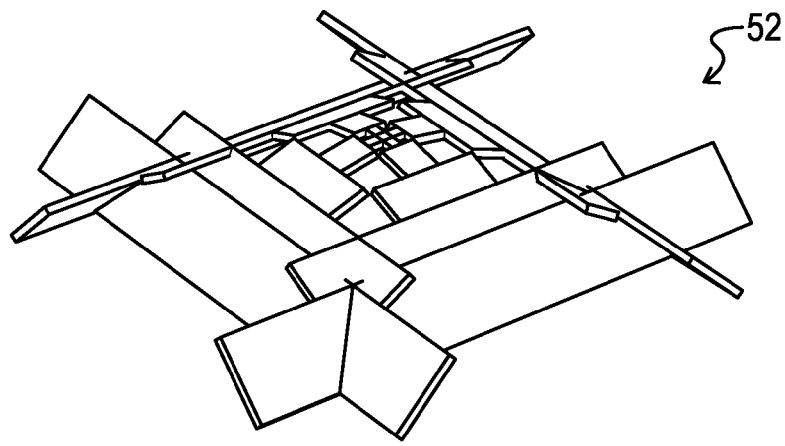
FIG. 11 is a three-dimensional diagram of an array such as that given in FIG. 9 having elements along two dimensions.
Figure 12:
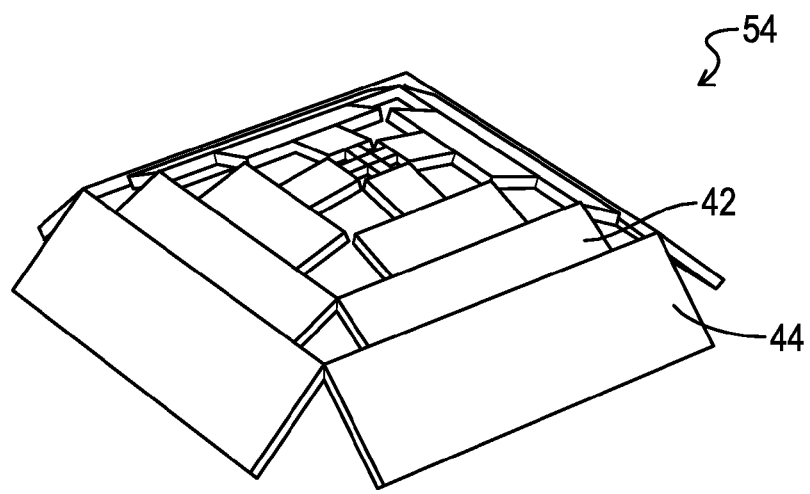
FIG. 12 is a three-dimensional diagram of an alternative embodiment of an array such as that given in FIG. 11 having elements along two dimensions.
Figure 13:
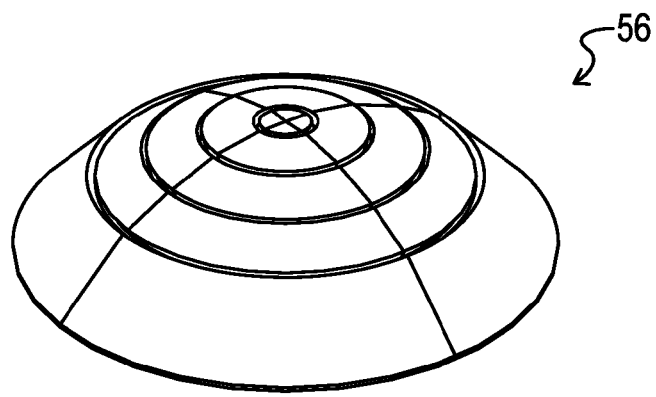
FIG. 13 is a three-dimensional diagram of an alternative embodiment of an array having elements curved in three dimensions.

FIGS. 7-10 described a one dimensional transducer array concept that produced a shaped acoustic beam pattern that directs acoustic energy in the ±45° direction with depressed acoustic energy at 0°. By duplicating this array and rotating the elements so that they are orthogonal to the pre-existing array, a two-dimensional transducer array 52 is developed as shown in FIG. 11. Array 52 produces shaped beam patterns in two planes. A more practical two dimensional array 54 is shown in FIG. 12. To maintain the sub-array area ratios, the widths of the outermost sub-arrays 42 and 44 having areas $A_1$ and $A_2$ would need to be increased.

This concept can be expanded further into arrays having sub-arrays oriented at any angle that evenly divide 360°. Ultimately, this leads to the embodiment shown in FIG. 12. Array 56 is composed of four conical sections assembled from truncated cones of various base diameters, stacked on one another. The conical sections gradually decrease in size from bottom to top with an active disc on top. The outer surface of each cone is slanted to a particular angular direction.

Array 56 produces a conical beam pattern that is depressed in the middle in accordance with the surface areas and slant angles chosen. Rectangular piston functions cannot be used to model array 56 as in array 34 and arrays 52 and 54. Instead, each of the conical sections has been modeled as a discrete baffled piston. Each of the piston functions is tilted and twisted to form the conic sections.

As briefly described above, these arrays could be fabricated from many different transduction technologies: PVDF piezoelectric polymer sheets, 0-3 piezo-rubber sheet, 1-3 piezo-composite n×m matrix, or Tonpilz transducer n×m elements. PVDF or co-polymers, (polyvinylidene fluoride trifluoroethylene) (P(VDF-TrFE)) are piezoelectric polymers available in thin sheets (up to 0.50 mm) and are more suited to hydrophone material than to projectors. These materials are available in continuous sheet forms and are semi-flexible; and their surfaces are coated with copper or silver that act as the electrode. Piezo-rubber materials have particles of piezoceramics suspended in a rubber-like matrix available in thicker sheets (3.30 mm). These are also more suited to hydrophone material than to projectors. These materials are available in continuous sheet forms, are semi-flexible, and their surfaces are coated with copper or silver that act as the electrode. The 1-3 piezo-composite material consists of thin piezoceramic rods aligned parallel to the poling direction and imbedded in a polymer filler (epoxies and polyurethanes). Their surfaces are coated with copper or silver that act as the electrode. These are also available in sheet form, are semi-flexible, and are suited to both hydrophone and projector material. Each piezoelectric rod forms an n×m matrix that could be used to fabricate a sub-array. Bending or forming 1-3 piezo-composite into a curved surface over solid ceramic material is one of its major advantages, though induced stresses and geometric distortion can be a challenge. The Tonpilz or Langevin type transducer designs are layered structures of metal piston, piezoceramic, and metal tail mass, which lowers the resonance frequency significantly compared to the 1-3 piezo-composite rod. These transducer elements have a lower mechanical $Q_m$, more surface area, are more efficient, and transmit more acoustic energy than a piezoceramic rod. A sub-array could be made up of n×m elements of these Tonpilz or Langevin type transducer elements.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive, nor to limit the invention to the precise form disclosed; and obviously, many modification and variations are possible in light of the above teaching. Such modifications and variations that may be apparent to a person skilled in the art are intended to be included within the scope of this invention as defined by the accompanying claims.

What is claimed is:

1. A method for designing an acoustic array comprising:
   determining a desired beam pattern of angles and associated power levels for the array;
   determining a desired acoustic wavelength for the array;
   determining a desired beamwidth for the array;
   establishing an array radius of curvature based on the determined acoustic wavelength and the desired beamwidth;
   modeling the array as a plurality of elements positioned on a curved surface having the established array radius of curvature;
   calculating an amplitude shading function as a plurality of weightings that when applied to the modeled array would give the desired beam pattern; and
   constructing an array of acoustic elements in accordance with the modeled array radius of curvature with each element at a location having an area proportional to at least one weighting given by the calculated amplitude shading function.

2. The method of claim 1 wherein each element has an arc length, angular extent, and a longitudinal extent, and the longitudinal extent is calculated to give the proportional area.

3. The method of claim 2 wherein each of the plurality of elements has the same angular extent and the longitudinal extent of each element is calculated to give the proportional area.

4. The method of claim 2 wherein each element has an arc length, angular extent, and a longitudinal extent, and the longitudinal extent and angular extent are calculated to give the proportional area.

5. The method of claim 2 wherein each element is flat and has a circumferential length that is a chord of the curved surface and a longitudinal extent, and the longitudinal extent is calculated to give the proportional area.

6. The method of claim 1 wherein the step of constructing comprises:
   designating a central point for said array; and
   constructing multiple subarrays with each subarray being distributed uniformly about the central point.

7. The method of claim 6 wherein each constructed subarray can intersect the elements of at least one other constructed subarray.

8. The method of claim 6 wherein said each constructed subarray is positioned apart from the other constructed subarrays.

9. The method of claim 8 wherein each constructed subarray is constructed from elements that are curved in two dimensions.

10. The method of claim 1 wherein said desired beam pattern has main lobes at bearing angles of 45° and −45° from the center of the array.

11. An acoustic array for a predetermined beam pattern comprising a plurality of elements with each element having an area and a position, wherein the area of the element corresponds to a power level and the position corresponds to a time delay, the power levels and the time delays being calculated to give the predetermined beam pattern.

12. The apparatus of claim 11 further comprising a signal source electrically joined to said plurality of elements for driving each of said plurality of elements with the same signal.

13. The apparatus of claim 11 wherein:
   the acoustic array is designed to conform to a curved surface; and
   each of said plurality of elements is substantially flat, has a length that is a chord of the curved surface, and a longitudinal extent calculated to give the area corresponding to the power level.

14. The apparatus of claim 13 wherein said plurality of elements are arranged in at least two subarrays positioned radially about a central point of said acoustic array, each subarray being designed to conform to the curved surface.

15. The apparatus of claim 11 wherein:
   the acoustic array includes a plurality of subarrays arranged radially around an array central point; and
   each of said plurality of elements is curved in two dimensions such that adjacent elements define an even curved surface, and each element has an arc length and a longitudinal extent calculated to give the area corresponding to the power level.

16. The apparatus of claim 11 wherein the predetermined beam pattern has main lobes at bearing angles of 45° and −45° from the center of the array.

* * * * *